Patented Sept. 17, 1940

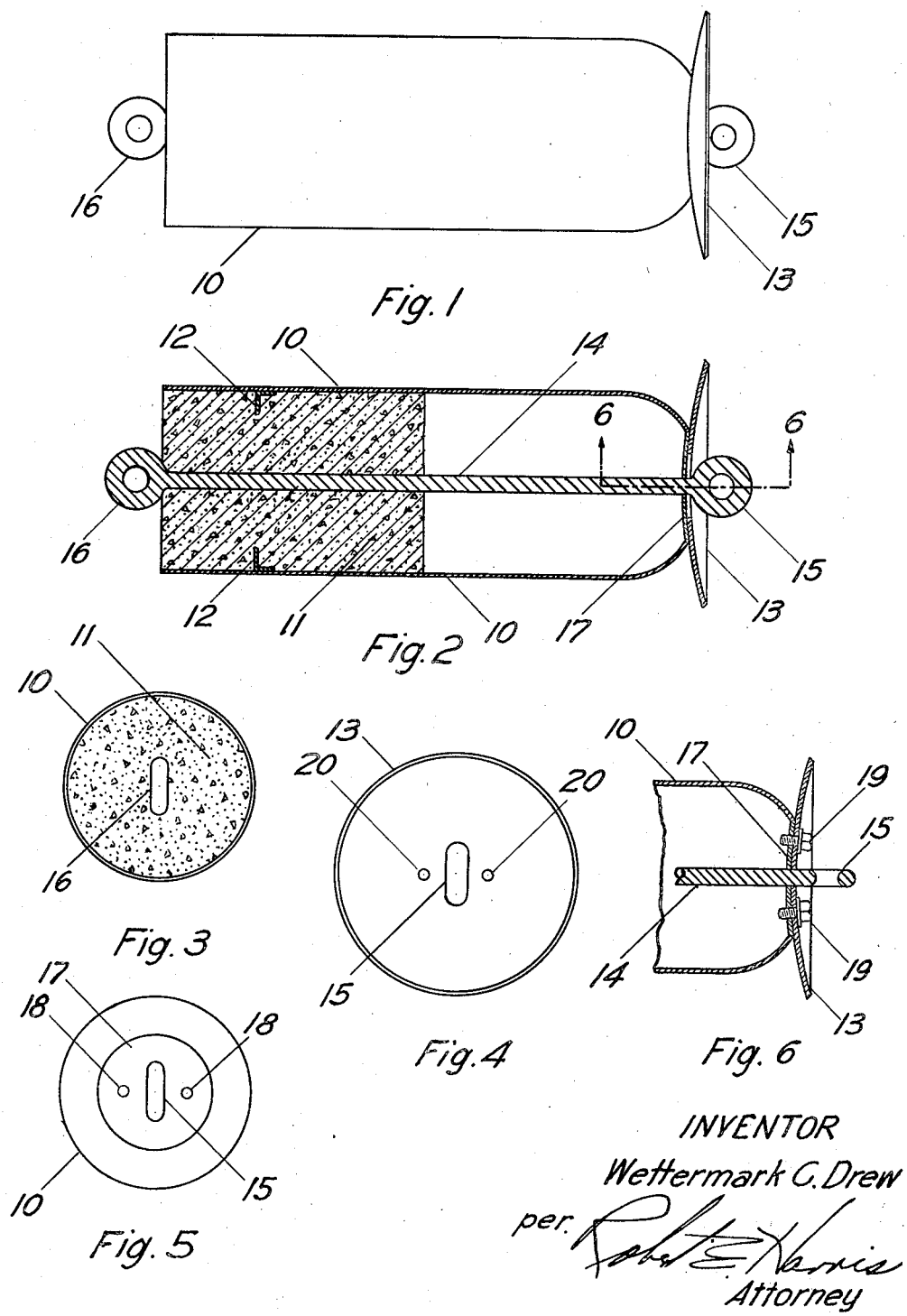

2,214,812

UNITED STATES PATENT OFFICE 2,214,812

IRRIGATION FURROW FORMER AND PACKER

Wettermark C. Drew, Santa Paula, Calif., assignor to California Fruit Growers Exchange, Los Angeles, Calif., a corporation of California Application December 11, 1939, Serial No. 308,650

7 Claims. (Cl. 97—55)

The objects of this invention are to provide a new and novel device for forming broad, shallow irrigation furrows, such device being adapted to be operated in hard or soft ground to produce a broad, comparatively shallow, well packed furrow, said device being further adapted to be effectively used for the packing of furrows.

These and other objects, uses, and advantages and adaptations of the invention will be apparent from the several illustrative forms of the invention hereinafter disclosed.

Irrigation practices with respect to orchards, and more particularly citrus orchards, have undergone many changes during the past years. When it was first found necessary to irrigate citrus orchards the practice of the orchardist was to build up ridges around the tree and flood the basin so formed by the ridges. This type of irrigation known as basin irrigation, although suitable when water was plentiful, could not be practiced during periods of water shortage, and growers changed to furrow irrigation. Furrows were usually made with a plow and as close to the trees and as deep as possible, the orchardist often times cutting tree roots with an axe in order to permit the plow shovel to dig deeper into the soil. Deep furrows were to reduce losses by evaporation, and to put the water deep into the ground. Gradually, however, irrigation practices changed from the use of deep furrows toward the use of wide, shallow furrows in order to avoid too deep percolation of the water and to permit a maximum horizontal spreading of the water. It was also found that the broad, shallow furrow is advantageous in that the water flows with less erosion and can be distributed throughout the top soil more uniformly and with greater efficiency. Further advantage arises where a cover crop is to be grown, since it will sprout more readily in the broad, shallow furrows and may be irrigated readily. The broad, shallow furrow in many cases permits the use of fewer furrows.

A still further important advantage of the broad, shallow, well packed furrow resides in the fact that sufficient water will flow to the lower end of the row before the upper end is too wet. This eliminates over-irrigation of the upper end and the under-irrigation of lower end of the row. For the most part, however, the equipment adapted to the forming of irrigation furrows of the type desired has not kept pace with the recent changes in irrigation practice. Devices which are simple, inexpensive, and efficient, and adapted to the making of broad, shallow furrows have not, up to the present, been available.

I am aware of such devices as those described in U. S. Patents No. 1,204,890, and No. 1,326,538.

The present invention is directed to a device which is capable of producing the type of furrow which is demanded by the present irrigation practice. The device of the present invention is new, simple of design, and inexpensive to manufacture. Furthermore, the device eliminates the shortcomings of the prior art.

The device comprises a combination of an efficient furrower and a furrow packer which is readily adaptable to the various types of soil in which the device is used. The device not only forms and packs a furrow in one operation, but in addition forms and packs a broad, shallow furrow of the type so much desired by present day irrigation practices.

In the drawing:

Fig. 1 is a side view of the device.

Fig. 2 is a longitudinal vertical cross-section view of the device.

Fig. 3 is a rear view of the device.

Fig. 4 is a front view of the device showing the disc in position.

Fig. 5 is a front view of the device with the disc removed.

Fig. 6 is a vertical cross-section view taken along the line 6—6 in Fig. 2, and shows details of construction.

Corresponding and like parts are referred to in the following description, and are indicated in all views of the drawing by the same reference numbers.

Referring now to the drawing in detail, it will be apparent that the embodiment of the invention which has been illustrated comprises an open-bottomed shell 10, partially filled with a cementitious material 11, supported within the shell by angle irons 12, fastened to the shell 10. Attached to the nose 17 of the shell 10 and removably fastened thereto is a disc blade 13. Passing centrally and longitudinally through the shell 10 and disc blade 13 is a metal tie rod 14, terminated at its extremities by eyes 15 and 16. The disc blade 13 has a cut out portion 21 to permit the disc blade to pass over the eye 15.

Figure 5 illustrates the device with the disc removed, thereby exposing to view the screw holds 18.

Figure 6 shows in detail a manner in which the disc blade 13 may be removably attached to the nose 17 of the shell 10 as by means of the cap screws 19.

The furrowing device illustrated in the drawing may be made in accordance with the following description, however, it is to be understood that many modifications in the type and kind of materials used in its construction may be made without departing from the general principles set forth. For example, I choose to construct my furrower in the shape of a torpedo since I believe the effect of this shape is advantageous in that it permits the device to slide easily over the ground. However, the device may be cylindrically constructed without the torpedo nose without departing from my invention. In addition, the relative proportions and relationships of the various parts may be varied within comparatively wide limits. Accordingly, when specific dimensions are referred to, it is merely for the purpose of disclosing to those skilled in the art a satisfactory size, and such dimensions are to be taken as in no wise critical.

To the inside of the tubular open-bottomed iron shell 10, which may have a diameter of about ten inches and be about thirty inches in length, there is welded two angle irons 12 opposite each other and at a distance of several inches from the bottom of the shell. These angle irons assist in supporting and anchoring the concrete 11 to be subsequently poured in the shell. They may be of any convenient size as, for example, one and one-half inches by one and one half inches by one-quarter inch. Passing centrally through the shell is an iron tie rod 14. One end of the tie rod terminates in a bent eye 16, and to the other end an eye 15 is welded. In weighting the shell I find it convenient to stand the shell on its nose, or forward end, while sufficient weighting material as, for example, class "A" concrete, is poured into the open end. The shell may then be placed with the nose up, whereupon the weighting material will settle to the rear end of the shell. The shell may then be allowed to stand undisturbed until the concrete has set. It is to be kept in mind that the amount of concrete poured into the shell will depend on how much weight is desired to be given to the device and this in turn will be dependent upon the type of soil on which the device is to be used. The weight of the shell may also be varied by varying the density of the concrete used, or by using other weighting materials as, for example, lead or other metals. Furthermore, it may be found that for various types of soil it would be advantageous to have additional weight in the forward end, or nose, of the device. Also the weight may be positioned in the middle of the shell. Any and all of these various modifications come within the scope of this invention. To the nose 17 of the shell a removable concave disc blade 13, having a diameter somewhat larger than the shell itself, is fastened by suitable means. Ordinary standard thread, cap screws 19 are suitable for fastening the disc to the shell, as indicated in Fig. 6.

In the operation of my device I have found it expedient to fasten the furrower at right-angles to a bar which is in turn fastened to and drawn behind a tractor or other motivating device. When it is found desirable to make more than one furrow at a time, several of my furrowing devices may be spaced along the draw bar and dragged behind the tractor. Also I have found it extremely advantageous to fasten my furrowing device behind a cyclone. Furthermore, in various types of loose soil I have found it desirable to fasten a discless packer in tandem fashion behind one with a disc for the purpose of additional packing.

As a further modification of my device, it may be used without the disc blade for the purpose of packing furrows formed in some other manner.

Numerous changes and modifications will be obvious to those skilled in the art and may be made without departing from the spirit of my invention. All such changes and modifications as are properly embraced thereby are intended to be included within the scope of the appended claims.

Having thus disclosed my invention in such full, clear, and concise language as to enable others skilled in the art to make and use the same, I claim as my invention and desire to secure by Letters Patent the following:

1. A furrowing device comprising a torpedo-shaped tubular shell, the rear end of said shell containing a cementitious material, the forward end of said shell having a disc blade removably attached thereto.

2. A furrowing device comprising a tubular shell having a disc blade attached to one end.

3. A furrowing device comprising a tubular shell weighted with a cementitious material and having a disc blade attached at one end of the shell.

4. A packing device comprising a torpedo-shaped tubular shell weighted with a cementitious material.

5. A furrowing device comprising a torpedo-shaped tubular shell, the rear end of said shell being weighted, the forward end of said shell having a disc blade removably attached thereto.

6. A furrowing device comprising a weighted tubular shell having a disc blade attached at one end.

7. A packing device comprising a torpedo-shaped weighted tubular shell adapted to be drawn nose forward along the ground.

WETTERMARK C. DREW.